Figure 3:
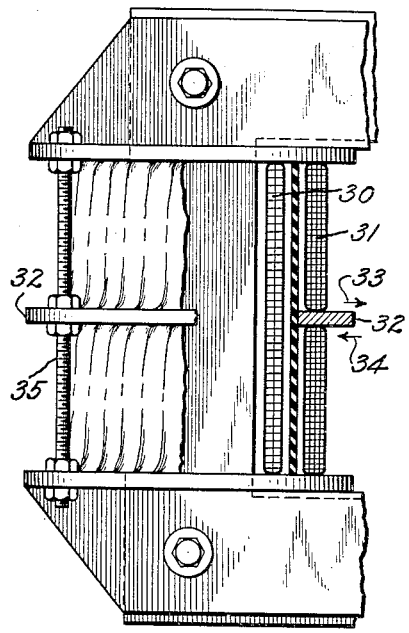

G. FACCIOLI.
ELECTRICAL APPARATUS.
APPLICATION FILED OCT. 11, 1916.
1,396,563.
Patented Nov. 8, 1921.
2 SHEETS—SHEET 1.
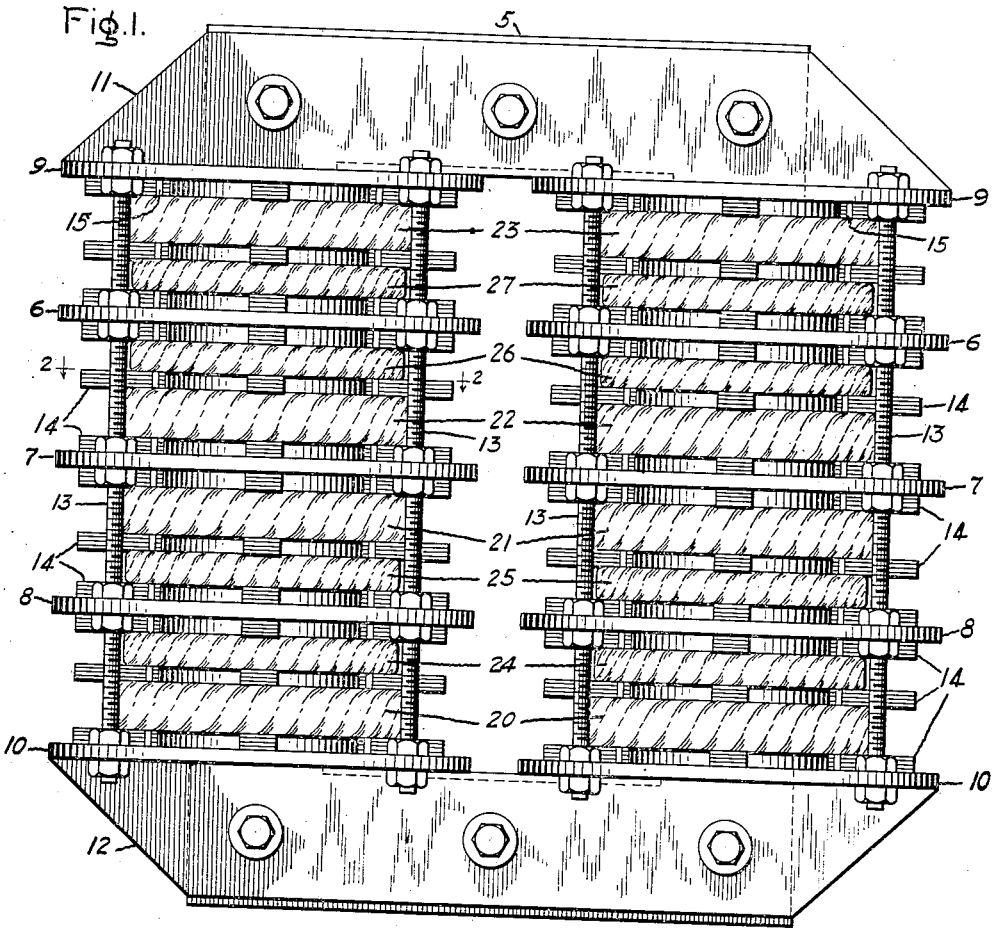
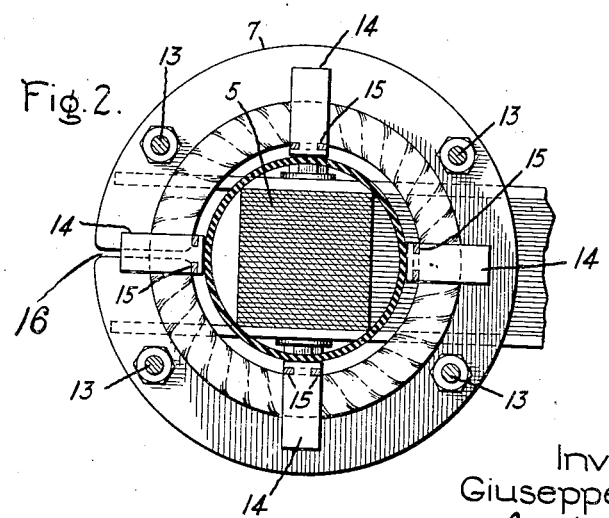
Inventor:
Giuseppe Faccioli
by Albert G. Davis
His Attorney.

G. FACCIOLI.
ELECTRICAL APPARATUS.
APPLICATION FILED OCT. 11, 1916.

1,396,563.

Patented Nov. 8, 1921.
2 SHEETS—SHEET 2.

Inventor:
Giuseppe Faccioli,
by Albert G. Davis
His Attorney.

UNITED STATES PATENT OFFICE.

GIUSEPPE FACCIOLI, OF PITTSFIELD, MASSACHUSETTS, ASSIGNOR TO GENERAL ELECTRIC COMPANY, A CORPORATION OF NEW YORK.

ELECTRICAL APPARATUS.

1,396,563.     Specification of Letters Patent.    Patented Nov. 8, 1921.

Continuation in part of application Serial No. 60,868, filed November 11, 1915. This application filed October 11, 1916. Serial No. 124,968.

*To all whom it may concern:*

Be it known that I, GIUSEPPE FACCIOLI, a citizen of the United States, residing at Pittsfield, in the county of Berkshire, State of Massachusetts, have invented certain new and useful Improvements in Electrical Apparatus, of which the following is a specification.

This case is in part a continuation of my earlier application Serial No. 60,868, filed on November 11, 1915.

My invention relates to various types of electrical apparatus; it is, however, particularly applicable to tranformers of large size. One of the objects of my invention is to provide the windings of electrical apparatus with spaces therebetween defined by planes substantially perpendicular to the axes of the windings, without materially affecting the operation of the apparatus. These spaces may be of substantially any reasonable dimensions and may be utilized for various purposes; for example, for admitting the passage of cooling fluids, or for receiving various devices extraneous to the windings which function independently thereof as those indicating the temperature thereof and as devices for carrying or supporting the windings. From another aspect therefore an object of my invention is to provide improved means for carrying or supporting electrical windings, particularly transformer windings of interleaved primary and secondary coils.

Spaces have been provided between electrical windings in the past where they have been found absolutely necessary, but both spaces and extraneous devices in windings have been avoided so far as possible and have been strictly limited in dimensions since it seemed, and was apparently universally believed, that all spaces detrimentally affected the desired operation of the winding by providing additional paths for leakage magnetic flux. For the same reasons masses of magnetic materials, such as iron and steel, exterior to the core and adjacent to the windings have been avoided so far as possible except in those cases where it has been desirable to increase the magnetic leakage. I have discovered, however, that there are certain points in electrical windings where the windings may be divided and where the component parts of the windings may be separated for considerable distances, and adjacent which magnetic materials may be located, even within the winding space, without materially effecting the leakage flux, and it is at these points that I provide so far as possible such spaces as may be required in the windings for any purpose. In such spaces I provide the extraneous devices which formerly would influence the magnetic leakage, but which it is desirable to locate adjacent the windings without detrimental effects. The number of such points is limited in any one winding. They may not therefore occur in sufficient number or be so disposed as to allow their utilization for the location of spaces and extraneous devices to the exclusion of all other points. Extraneous devices and spaces may be provided at such other points under the same conditions as heretofore where they may be required to supplement those provided according to my invention, but the action of the apparatus in such cases may generally be benefited by prescribing to the spaces and extraneous devices located according to my invention all such functions as it is possible for them to perform. The spaces of my invention may therefore be used to supplement the prior spaces, performing both their former functions and in addition those for which they are unadapted.

The type of winding, and the course and character of the currents traversing it determine the number and location of points where spaces may be provided according to my invention. The location however, may be found from the following considerations: In providing spaces and devices in and adjacent to windings it is generally essential not to vary the course of the working or load magnetic flux; that is, it is essential that the leakage flux, or that which traverses the body of the winding more or less transversely to its axes, be not increased. Now I have discovered that there are certain points in substantially all windings where there is no leakage flux in some direction, as perpendicular to the winding axis (at least no leakage flux of some particular part of the whole current as will be later explained in more detail), and where the resultant magnetomotive force in that direction tending to produce such leakage flux, is substantially zero. It is at these points that the windings may be opened for considerable distances, separating the coils or portions of the windings, so that extraneous devices may be located without detrimentally effecting the desired action of the winding to a material extent. The magnetomotive force at any point is the resultant of all the magnetomotive forces acting at that point. Thus the component magnetomotive force tending to produce leakage of the flux of any winding at any point in any given direction, is the resultant of all the magnetomotive forces components acting in the winding at that point and in that direction. When this resultant component is zero in any case, there is and can be no leakage magnetic flux in that direction and hence the winding may be opened at that point, that is the space factor of the coils adjacent that point, may be increased, and devices inserted therein if desired, or located adjacent thereto, without detrimental effects so long as the space or device provided continues in the direction or plane of the zero magnetomotive force.

For a more complete understanding of the nature and objects of my invention reference should be had to the following detailed description taken in conjunction with the accompanying drawing in which:—

Figure 5:
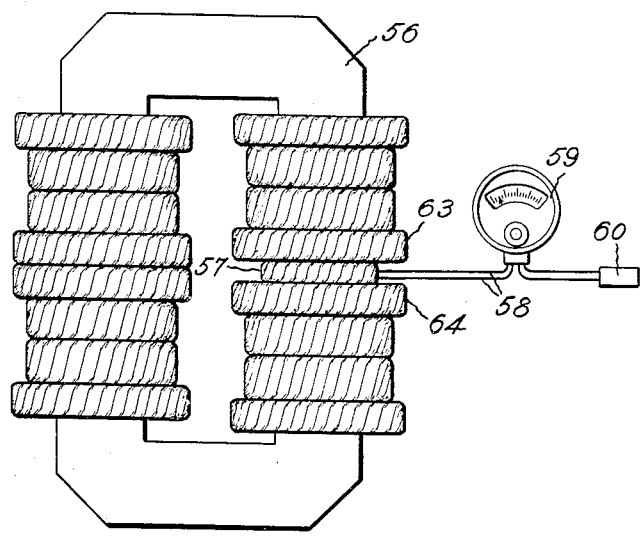
Figure 4:
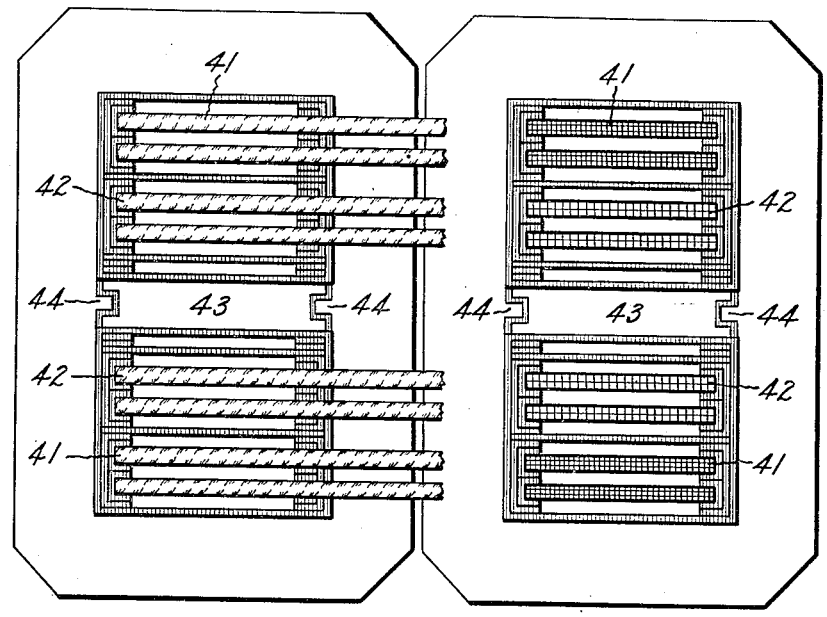

Figure 1 is an elevation of an intermixed disk coil transformer with supports for the winding inserted therein. Fig. 2 is a section of the same transformer on the line 2—2 of Fig. 1, looking in the direction of the arrows. Fig. 3 is an elevation partly in section of two cylindrical coils about a single core with a winding support. Fig. 4 partly in section, illustrates an embodiment of my invention in shell type transformers. Fig. 5 is an elevation of a transformer of the disk coil type with a temperature indicating device inserted in one of the windings near the middle thereof in accordance with my invention.

The transformer of Fig. 1 comprises the core 5 and two similar stacks of intermixed or interlaced primary and secondary coils, the coils of each stack surrounding one leg of the core, and hence substantially a single rectilinear axis. Each such stack may be considered as a separate winding and hence may be separately supported; the principal internal stresses to be combated by the supports of such a winding are those tending to move the coils toward and from each other. The supports of only one stack will be described in detail, the supports of the other being similar. The winding of the stack at the left of Fig. 1 is supported and carried by the plates 6, 7 and 8, inserted into the windings between coils thereof, and the plates 9 and 10 at the ends of the stacks. The plates 9 and 10 are carried and supported by the core plates 11 and 12 which in this case act also as core clamping plates.

The inserted plates 6, 7 and 8 are carried by the threaded rod 13, passing through the plates, and the nuts thereon as indicated, the rods being themselves carried by the end plates 9 and 10. The plates are separated from and engage the coils through the coil spacers 14. Similar spacers provide other spaces between coils, as between the coils 20 and 24. These spacers are of insulating material, are held in place by the rods 15 of insulating material, and basicly are designed to separate the coils so far, but only so far, as is necessary for ventilation and insulation; their general construction and use are well known. Between each two plates, the coils and spacers fit more or less tightly. The construction of the plates 6–10 is clearly illustrated in Figs. 1 and 2; each plate is generally a flat annular member and if of metal as assumed in this case, is provided with a break in its circumference as at 16 in order that it may not act as a short-circuited secondary winding on the transformer. The plates may be of any suitable material, metal may be chosen if necessary or desirable to secure the requisite strength including magnetic material such as iron or steel which may be used without deleterious effects. Since the plates 6–10 may be made as thick as necessary to secure the requisite strength, it is apparent that each group of coils between two plates is, in effect, supported and carried independently of the other coil groups, the presence or absence of which has no effect on the positioning of that particular group. And since as will be apparent later, the coils, particularly of this type of winding, may be arranged to admit a considerable number of plates relative to the number of coils, the winding as a whole and all its parts may be rigidly supported and held in place against enormous internal stresses.

It is with the inserted plates 6, 7 and 8 that care must be taken in accordance with my invention to secure their proper position since their locations depend upon the distribution of the effective leakage magnetomotive forces. Unless these locations are properly chosen, the spaces provided for the plates (and the plates themselves if of magnetic material) may result in such increases in the leakage magnetic fluxes as to prohibit the use of these supports. Now the value of the effective magnetomotive force at any point in space is the vector sum of all the magnetomotive forces acting at that point, but where a number of closely inductively related coils carry currents around substantially a rectilinear axis as in this case, I have found that the magnetomotive force substantially perpendicular to that axis at any point, at least close to the axis, may be substantially computed by determining the algebraic sum of the magnetomotive forces or ampere turns of all those coils at both sides of that point, taking as positive (or negative) all those magnetomotive forces or ampere turns acting inward toward the axis at that point and as negative (or positive) all those magnetomotive forces or ampere turns acting outward from the axis at the same point.

The magnetomotive force across probably any winding at any point thereof may be substantially determined in this way and the zero points of such magnetomotive forces located. However, in the particular case of a number of closely inductively related coils carrying currents in opposite directions and distributed along and surrounding a rectilinear axis, and particularly where they surround a core of magnetic material as in Fig. 1, I have found that the values of the resultant leakage magnetomotive forces, or magnetomotive forces to or from the axis and across the coils, may be determined in a somewhat simpler way; I have found that under certain conditions such resultant magnetomotive force at any particular point is substantially equal to the algebraic sum of all the ampere turns between that point and one end of the coil stack or winding, providing that in the entire stack or winding, the total number of ampere turns in one direction are equal to the total number of ampere turns in the other direction (as in the case of the load-ampere turns in a transformer), taking as positive (or negative) the turns in which the current flows in one direction and as negative (or positive) the turns in which the current flows simultaneously in the opposite direction; it is immaterial which end of the stack is chosen in making this computation. This rule applies particularly where the coils are distributed along a core of magnetic material which forms part of an unsaturated flux path. The leakage magnetomotive forces for the type of winding shown are of zero value at those points where the algebraic sum of the ampere turns between each of said points and one end of the stack or winding is zero. Employing this method of computation it is possible to arrange for, a sufficient number of points of zero magnetomotive forces substantially perpendicular to the winding axis, that it is possible by taking advantage of them, to support with substantially any desired degree of rigidity and against forces of almost any values a winding of intermixed coils carrying equal currents in opposite directions.

Figure 1 illustrates what may be taken as a typical transformer; the last method for calculating the points of zero leakage magnetomotive force will be therefore readily understood by following through in detail a calculation for this transformer. Assuming that the high voltage coils 20, 21, 22 and 23 contain equal numbers of turns and that the low voltage coils 24, 25, 26 and 27 contain equal numbers of turns, it will be seen that each plate 6, 7 or 8, is located at the desired points. Thus computing from the top of the stack, the load-ampere turns of the coil 23 minus the load-ampere turns of the coil 27 equals zero, giving zero leakage magnetomotive force at plate 6; likewise the load-ampere-turns of the coils 23 and 22 added together, minus the load-ampere-turns of the coils 27 and 26 added together, equals zero giving zero leakage magnetomotive force at plate 7. That the plate 8 is also located at a point of zero leakage magnetomotive force may be determined in a similar manner. These supports 6, 7 and 8 are of course proportioned only to extend substantially along the planes of these zero magnetomotive forces. They therefore, together with the spaces between the coils for admitting them, extend substantially perpendicular to the core leg, for as will be readily understood, the effects of the magnetomotive forces tending to produce flux leakage to and from the legs of the core across the windings of the transformer of Fig. 1, are substantially perpendicular to the legs, at least near the legs. With nearly every form of apparatus, the directions of most of the leakage magnetomotive forces, and hence the leakage fluxes, are substantially perpendicular to the axes of the windings, particularly in the neighborhood of the axes. If supports of other than magnetic material are used, the direction of the extent of the supports is immaterial except as and where they determine the direction of the extent of the spaces provided for their admittance.

The effects on the exciting current of the plates 6, 7 and 8 and the separation of the coils at these points, have been disregarded since the flux effects of the exciting current may be more or less materially changed without rendering the device impracticable. The effect on the exciting current to be generally anticipated, is only such as to result perhaps in some reduction of the transformation ratio by shunting a portion of the exciting flux which otherwise would cut the secondary winding. The amount of the flux so shunted will remain substantially constant throughout changes in load, and therefore such an effect may be readily compensated for, for example, by slight changes in design as by change in the ratio of primary to secondary turns. However, if the occasion arises when it is desirable to take account of the effect of the magnetomotive force effects of the load and exciting currents combined in determining the location of the winding supports, obviously it may be done without departing from my invention. As illustrating such a case, suppose that in Fig. 1 the plates or supports 6, 7 and 8 are to be deliberately located at points of material leakage magnetomotive forces. This may readily be obtained, along with the advantages of positive support for the winding, by locating the supports for the windings at points of some slight leakage magnetomotive forces, the greater the reactance desired the higher should be the values of the leakage magnetomotive forces at the points chosen for the location of the supports. Assuming the coil 24 to comprise a greater number of turns than any one of the coils 25, 26 or 27, the plate 8 (if of magnetic material, otherwise the space between the coils only) acts as an active magnetic shunt between certain primary and secondary turns, increasing the reactance of the transformer over what it would be were the plates (and the additional spacing between the coils to admit the plates) omitted.

It will be observed that the transformer of Fig. 1 has spaces between the coils other than those receiving the supporting plates 6, 7 and 8, that is the spaces between the coils 23 and 27, between 26 and 22, between 21 and 25, and between 24 and 20. All the spaces now appearing in the transformer between the coils would be found were my invention omitted, to require being filled up; however, in such case all the spaces would be of substantially the same size. In the present embodiment of my invention I have given to the spaces receiving the plates 6, 7 and 8 the additional function of receiving these plates, and employ the other spaces only for the functions they have heretofore had, that is ventilation and insulation of certain parts of the windings, and functions for which it is impossible to employ the spaces adjacent 6, 7 and 8 because of their necessary location. I may use the spaces adjacent 6, 7 and 8 for receiving the supporting plates for these spaces may be increased in size sufficiently to admit these plates without detrimentally changing the operation of the transformer to any material extent from what might be expected were all the spaces of the same size for the reasons before pointed out. When the windings are thus separated, the space occupied by the windings as a whole has been increased, so that the ratio of the now allotted winding space to that formerly occupied is also increased. This ratio is conventionally designated the "space factor" of the windings. In opening the windings adjacent supports 6, 7 and 8, the space factor is here increased locally in the direction of the winding axes.

In Fig. 3 I have illustrated a somewhat different embodiment of my invention. The device here shown comprises cylindrical coils 30 and 31, concentrically placed about a core leg on a substantially rectilinear axis, and may or may not be a transformer while the two coils may or may not simultaneously carry currents in opposite directions. Such a cylindrical winding as the coil 31 where all the parts thereof carry current in the same direction, may be opened at its midpoint, and a support 32 may be inserted there as indicated, without antagonistically affecting the magnetomotive force of the winding in the direction of its axis; the support 32 may be similar to the support 6 of Figs. 1 and 2 and is carried by rods 35 like the rods 13. At every instant the magnetomotive force due to the upper half of the coil 31 and in the plane of the extent of the support 32 acts in exactly the opposite direction to the magnetomotive force in the same plane due to the lower half of the coil 31. The arrows 33 and 34 indicate these two magnetomotive forces at some instant. Since the two halves of the coil have equal numbers of turns and carry the same value of current at every instant, these two magnetomotive forces neutralize each other in the plane perpendicular to the axis of the coil and the resultant effective magnetomotive force in that plane is zero in value. It is possible therefore, to separate the two halves of the coil 31 a short distance and insert a support as 32, of magnetic material or otherwise, without shunting a material amount of flux. In a case like this, however, the distance which the coils may be separated without serious antagonistic effect is more limited than in the case of the construction of Fig. 1, and likewise the possible thickness of any magnetic material between the coils is more limited, for if this distance or this thickness is too great, the two magnetomotive forces may not neutralize each other, but may act separately to produce separate fluxes, opposite in direction, and of sufficient effect to materially detract from possible flux along the winding axis.

It may be noticed in connection with Fig. 3, that the support 32 for the coil 31, even though of magnetic material has no effect, unless of undue thickness, on the reactance or other action of the device if this device is used as a transformer. For as it has been shown that this support has no effect on the flux action of the coil 31, in the same way it may be shown that the same support has no effect on the flux action of the coil 30.

Fig. 4 illustrates one way in which my invention may be readily embodied in shell type transformers. The high voltage coils 41 and the low voltage coils 42 have been so arranged as to produce a point of zero magnetomotive force across the winding spaces at the locations of the supports 43. The ends of these supports, each of which extends from the center leg to an outer leg of the core, are provided with recesses to receive projections 44 on the legs by which the supports are carried. The supports 43, if of magnetic material as iron or steel, may be separated from the legs by some nonmagnetic material in order that any magnetomotive forces, not neutralized out, including in this particular case those due to the exciting current, may produce a minimum value of flux through the supports antagonistic to the normal working of the transformer.

Fig. 5 illustrates my invention employed for the purpose of determining the temperature of transformer windings during normal operation. In this transformer the core 56 is generally rectangular and carries the windings on two opposite legs. These windings are made up of a plurality of intermixed coils but the coils are not spaced apart for ventilation or insulation, except as the conductors of the coils are spaced by the insulation of the coils. The windings on the two legs of the core 56 are similar except that the winding on the right-hand leg is opened near its center to admit the temperature determining member 57. This member substantially closes the space between the transformer coils. It is desirable at times to insert a temperature indicator directly into a winding, the indicator being of the electrical type in order that the indicator part itself may be located outside the transformer container and possibly at some distance from the transformer. In such a case the part of the temperature device located within the winding must be thoroughly and heavily insulated in order that no contact may be established between the conductors of the temperature device and the conductors of the winding. Such extensive insulation, however, requires that the space within the winding be of considerable proportions which may readily be done where my invention is employed.

In Fig. 5 the part 57 of the temperature device is located between the two low voltage coils 63 and 64 at a point where the total leakage magnetomotive force is zero. The thermo-couple (or the resistance coil, or whatever the active element of the device may be) is connected by the conductors 58 to indicating portion 59 of the device, the member 60 is the so-called outside or cool element. Of all the possible points at which a winding may be opened (or which may be arranged for) that point, of course, will be chosen for the insertion of the member 57 which is best adapted for the member 57 in order that it may most accurately and readily indicate the temperature of the part of the apparatus to be investigated.

While I have described the principle of my invention and the best mode I have contemplated for applying this principle, other modifications will occur to those skilled in this art and I aim in the appended claims to cover all such modifications which do not depart from the spirit and scope of my invention. In order to simplify the claims the word "substantially" is used as modifying zero magnetomotive forces, including thereunder the variations from the absolute zero made by design, as to procure a desired high value of transformer reactance, as well as unavoidable variations from the absolute zero.

What I claim as new and desire to secure by Letters Patent of the United States, is,—

1. A winding for electrical apparatus having a rectilinear axis divided into sections to provide spaces therebetween defined by planes meeting the axis at an angle; the spaces between sections being enlarged which occur at places along the axis where the resultant magnetomotive force in the direction of said defining planes does not materially change with a change in the current whose flux is to be conserved, whereby to receive devices adapted to function independently of the winding.

2. A winding for electrical apparatus having a rectilinear axis divided into sections to provide spaces therebetween defined by planes meeting the axis at an angle; the spaces between sections being enlarged which occur at places along the axis where the resultant magnetomotive force in the direction of said defining planes does not materially change with a change in the current whose flux is to be conserved, whereby to receive devices adapted to function independently of the winding, the longitudinal dimension of such spaces along said axis being different at different places.

3. A winding for electrical apparatus, comprising interleaved primary and secondary coils spaced apart along a common rectilinear axis, said winding having its space factor along the winding axis increased at a point thereon where the difference between primary load ampere-turns and secondary load ampere-turns from said point to one end of the winding is substantially zero; the increase in said spaces thereby provided being proportioned to receive a device adapted to function independently of the winding at said point.

4. A winding for electrical apparatus having an axis which is substantially a straight line, said winding being composed of sections spaced apart along said axis; the spacing of said winding being enlarged at a point on the axis where the resultant magnetomotive force in a general direction perpendicular to said axis is substantially zero.

5. A winding for electrical apparatus having an axis which is substantially a straight line, said winding being composed of sections spaced apart along said axis; the spacing of said winding being enlarged at a point on the axis where the resultant magnetomotive force in a general direction perpendicular to said axis is substantially zero, and independent means for rigidly supporting said winding inserted in said enlarged space.

6. A winding for electrical apparatus having an axis which is substantially a straight line, divided into sections and spaced apart along said axis, a space being provided at a point where the value of the resultant magnetomotive force in the general direction perpendicular to said axis does not change substantially with a change in the current whose flux is to be conserved; such space being adapted to receive means for supporting a part of the winding section independently of the rest of the winding.

7. A winding for transformers and the like, comprising interleaved primary and secondary coils spaced apart and distributed along an axis which is substantially a straight line; predetermined spaces which occur on said axis at points where the difference between primary load ampere-turns and the secondary load ampere-turns lying between such points and one end of the winding is zero being enlarged, and adapted to receive independent means for rigidly supporting said coils.

8. A winding for transformers and the like, comprising interleaved primary and secondary coils spaced apart and distributed along an axis which is substantially a straight line; predetermined spaces which occur on said axis at points where the difference between primary load ampere-turns and the secondary load ampere-turns lying between such points and one end of the winding are zero being enlarged, and adapted to receive devices adapted to function independently of the winding.

9. A winding for transformers and the like comprising interleaved primary and secondary coils spaced apart and distributed along an axis which is substantially a straight line; a predetermined space being materially enlarged in the direction of the axis at a point thereon where the difference between the primary load ampere-turns and the secondary load ampere-turns computed therefrom to one end of the winding is zero.

10. A winding for transformers and the like, comprising interleaved primary and secondary coils spaced apart and distributed along an axis which is substantially a straight line; a predetermined space being materially enlarged in the direction of the axis at a point thereon where the difference between the primary load ampere-turns and the secondary load ampere-turns computed therefrom to one end of the winding is zero, and means for rigidly supporting a portion of the coils independently of the rest of the winding inserted in said enlarged space.

11. A winding for electrical apparatus having a rectilinear axis and divided into sections to provide spaces therebetween defined by planes meeting said axis at an angle, said winding sections having respectively such a number of exciting turns that a resultant component of zero magnetization exists throughout the said spaces in a direction defined by said planes independently of the direction or magnitude of excitation of said turns whereby devices adapted to function independently of the windings may be inserted in said spaces without distortion of useful field flux.

12. In a transformer, spaced primary and secondary sections alternately arranged on each side of a central plane at right angles to the winding axis, the algebraic sum of the exciting turns of the primary and the counter E. M. F. turns of the secondary sections being equal to zero on each side of the central plane.

In witness whereof, I have hereunto set my hand this 6th day of October, 1916.

GIUSEPPE FACCIOLI.